United States Patent [19]

Higashiya et al.

[11] Patent Number: 5,196,974
[45] Date of Patent: Mar. 23, 1993

[54] RAIL-TYPE FLOATING MAGNETIC HEAD SLIDER

[75] Inventors: Teruyoshi Higashiya, Hiratsuka; Yoshihiko Miyake, Odawara; Mikio Takada, Kanagawa; Toshinori Kazama, Hiratsuka; Kousaku Wakatsuki, Ibaraki, all of Japan

[73] Assignee: Hitachi, Ltd., Tokyo, Japan

[21] Appl. No.: 641,255

[22] Filed: Jan. 15, 1991

[30] Foreign Application Priority Data

Jan. 22, 1990 [JP] Japan .................................. 2-10622
Jan. 24, 1990 [JP] Japan .................................. 2-12481

[51] Int. Cl.⁵ .............................................. G11B 5/60
[52] U.S. Cl. .................................................. 360/103
[58] Field of Search ............................... 360/103–104

[56] References Cited

U.S. PATENT DOCUMENTS

| | | |
|---|---|---|
| 4,486,798 | 12/1984 | Feliss et al. |
| 4,490,766 | 12/1984 | Hill et al. |
| 4,670,806 | 6/1987 | Ghose .................... 360/103 |
| 4,814,906 | 3/1989 | Suzuki et al. .............. 360/104 X |
| 4,984,114 | 1/1991 | Takeuchi et al. ............ 360/103 |
| 5,062,017 | 10/1991 | Sirom et al. ............... 360/103 |
| 5,097,370 | 3/1992 | Hsia ...................... 360/103 |

FOREIGN PATENT DOCUMENTS

| | | |
|---|---|---|
| 198619 | 10/1986 | European Pat. Off. |
| 57-179969 | 11/1982 | Japan. |
| 58-111164 | 7/1983 | Japan. |
| 60-47278 | 3/1985 | Japan. |
| 61-230687 | 10/1986 | Japan. |

*Primary Examiner*—John H. Wolff
*Attorney, Agent, or Firm*—Fay, Sharpe, Beall, Fagan, Minnich & McKee

[57] ABSTRACT

Protruding portions are formed on outflow ends of slider rails on a floating magnetic head slider. This floating magnetic head slider is of rails type. Each of the protruding portion extends farther to the outside as it approaches the outflow end. Or the external sides of the rails on the magnetic head slider are so arranged that angles formed thereat diverge from the side of the inflow end to the side of the outflow end, and a pressure adjusting aperture is formed on the outflow side of each of the rails. Because of the above arrangement, it is possible to provide a magnetic head unit in which particles, such as dust, adhering to the disk surface are effectively removed, and in which floating stability is not impaired. Removing the particles on the disk surface is not limited by seeking directions even while the magnetic disk unit is in operation.

4 Claims, 7 Drawing Sheets

DIRECTION IN WHICH MAGNETIC DISK ROTATES $h_1$ : FLOAT GAP ON GAS INFLOW SIDE $h_2$ : FLOAT GAP ON GAS OUTFLOW SIDE

FIG. 9

$D_1 < D_2$ $D_1$ : DIAMETER OF PRESSURE ADJUSTING APERTURE ON GAS INFLOW SIDE

$D_2$ : DIAMETER OF PRESSURE ADJUSTING APERTURE ON GAS OUTFLOW SIDE

RAIL-TYPE FLOATING MAGNETIC HEAD SLIDER

BACKGROUND OF THE INVENTION

1. Field of the Invention

The present invention relates to a magnetic head slider for a floating magnetic head. More particularly, it relates to a magnetic head slider for a floating magnetic head which is especially suitable for removing particles, such as dust, adhering to the disk surface of a magnetic disk unit.

2. Description of the Related Art

In general, to achieve high recording density in magnetic head units, the float gap (flying height) between a magnetic head and the recording medium of a magnetic disk unit tends to be narrow. Because of this narrowness, particles on the magnetic disk surface may become caught by tapered portions on inflow ends of magnetic heads, and intrude into the float gap between the magnetic head and the magnetic disk, thereby causing recorded information temporarily not to be read. Particles adhering to the magnetic disk surface may further be buried in a magnetic film of the magnetic disk, thereby leading to the problem of sliding. The possibility of such a problem has been increasing.

There are two methods of removing particles adhering to the magnetic disk surface. One is to clean the single magnetic disk before the disk is incorporated into an HDA (Head Disk Assembly). The other is to remove micro-particles, such as dust, present on the magnetic disk after the disk has been incorporated into the HDA, whereby the magnetic disk is prevented from being damaged.

Japanese Patent Unexamined Publication No. 57-179969 discloses a method of preventing abrasion. In this method, rails, which act as floating faces of a magnetic head slider, have hitherto been substantially parallel to a tangential velocity vector line of the rotatable magnetic disk. Skew angles are formed on the magnetic head slider so that slightly oblique angles are formed with respect to the tangential velocity vector line on the track of the magnetic disk. Because of the above arrangement of the magnetic head slider, micro-particles such as dust strike against the back edge of the magnetic head slider having the magnetic head, thereby preventing the magnetic disk from abrasion.

Furthermore, Japanese Patent Unexamined Publication No. 58-111164 discloses a method of cleaning a magnetic disk surface. In this method, a substantially square magnetic head slider is provided at slightly oblique angles, or skew angles, with respect to a tangential direction on the track of a magnetic disk surface. Because of the skew angles in this arrangement, for a seeking direction in which slider sides are positioned in front of inflow ends, particles adhering to the magnetic disk first come in contact with the slider sides. These particles which are in contact with the slider sides are scraped away by the slider sides, and are then carried along the surfaces of the slider sides, whereby the magnetic disk surface is cleaned.

Moreover, Japanese Patent Unexamined Publication No. 60-47278 discloses a method of preventing the abrasion of a magnetic head element. In this method, a magnetic head slider is constructed in such a manner that the width of the magnetic head slider on its front end is the same as that of the magnetic head slider on its back end with respect to movement directions of a magnetic recording medium. A longitudinal sharp line is so formed as not to be parallel to an outline. Thus, a floating face is formed on which pressure is generated to maintain the small gap between the surface of the magnetic recording medium and the head slider.

In addition, Japanese Patent Unexamined Publication No. 61-230687 discloses a head slider. In a magnetic head for an air floating magnetic disk, this head slider, composed of a single rail, is provided with tapered portions so that the width of the rail becomes wider as it approaches an outflow end of the slider. Thus, the entire head slider is shaped into a trapezoid. Because of this shape, the head slider is insensitive to air flowing at an angle oblique to relative movement directions of the slider and of the disk.

In all of the conventional art disclosed in Japanese Patent Unexamined Publication Nos. 57-179969, 58-111164, and 60-47278, when a magnetic head slider having a plurality of rails which are parallel to each other is positioned over a magnetic recording medium, the rails are arranged at slightly oblique angles so that the rails are not parallel to a tangential vector line on the rotatable magnetic recording medium, or the rails are previously arranged so that they are not parallel to the external sides of the magnetic head slider. Skew angles are thus formed, whereby the slider sides scrape away particles adhering to the magnetic disk surface. For the above reasons, the seeking direction limits the effects of cleaning.

In other words, when seeking is made in one direction in which the slider side is scraping away particles adhering to the magnetic disk surface, the adhering particles are removed from the magnetic disk surface, whereby the magnetic disk surface is cleaned. On the contrary, when seeking is made in the opposite direction, particles adhering to the magnetic disk surface are not scraped away. These adhering particles are caught by the tapered portions on the head inflow ends, and are then buried in a magnetic film of the magnetic disk. The particles thus buried in the magnetic film of the magnetic disk cause damage to the magnetic disk and the head surface, whereby the magnetic disk surface is not cleaned.

However, while the magnetic head unit is in operation, powder and dust caused by abrasion of the unit components are constantly generated. Moreover, the magnetic head performs seeking operations very frequently in both directions. The cleaning methods of the conventional art are not sufficient for cleaning the magnetic disk surface.

Furthermore, in the conventional art disclosed in Japanese Patent Unexamined Publication No. 61-230687, a method of removing particles adhering to the disk surface is not considered. In addition, since the head slider is of single rail type, the floating stability of the head is low while the head is operating, as compared with the floating stability of a head having a plurality of rails such as a two-body type head. Thus, this head slider is not suitable for low floating heads.

SUMMARY OF THE INVENTION

An object of the present invention is therefore to solve the problems of the above conventional art, and to provide a magnetic head slider of the type having a plurality of rails, which has the function of cleaning particles, such as dust, adhering to the disk surface, and which does not impair floating stability, this cleaning being made regardless of the seeking direction.

To achieve the above object, in accordance with an embodiment of the present invention, a pair of slider rails are formed on both sides of the slider of a floating magnetic head. Wing-like triangular protruding portions are formed on outflow ends of the slider rails as parts of the slider rails; the width of each of the wing-like triangular protruding portions becomes wider (extends outwardly) as it approaches the respective outflow end.

In another embodiment of this invention, internal sides of tapered portions and of rail portions on a magnetic head slider are provided so as to be substantially parallel to a tangential velocity vector of a rotatable magnetic recording medium. Predetermined skew angles diverging from gas inflow ends to gas outflow ends are formed on the external sides of the rails. To maintain a stable floating posture while the magnetic head slider is floating up, pressure adjusting apertures are formed on the gas outflow sides of the respective rails.

The operations of the above components will be explained.

In the first embodiment of the present invention, particles adhering to the rotatable magnetic disk surface are first brought into contact with the protruding, slant sides of the wing-like portions on the slider of the floating magnetic head. The particles are then scraped away and carried along the surfaces of the respective sides, and are removed from the disk surface.

In the above case of this invention, the wing-like triangular protruding portions are formed on both the sides of the slider. Because of this arrangement, when the magnetic head is performing seeking operations from the external circumference of the disk to the internal circumference and vice versa, the wing-like triangular protruding portions are always positioned in front of the inflow ends with respect to the seeking directions. It is thus possible to effectively scrape away dust from the disk surface.

Furthermore, the wing-like protruding portions are not formed along the whole length of the slider, but are formed only on the outflow ends. Since the wing-like protruding portions are formed in this manner, the floating characteristics of the slider are little affected, whereby good floating characteristics are maintained.

In the case of the second embodiment of this invention, as will be described later, predetermined skew angles are respectively formed on the external sides of the inner rail as well as the outer rail of the magnetic head slider. Because of these skew angles, when the magnetic head slider moves to the internal circumference region of the magnetic recording medium, or to the external circumference region, the rail external sides are always positioned in front of the tapered portions. Thus, micro-particles, such as dust, which are adhered to the magnetic recording medium and whose sizes are larger than the float gap strike against the external sides, and are then removed. As a result, the magnetic disk is not damaged by dust which has intruded through the tapered portions. The high reliability of the magnetic disk unit can thus be achieved. In addition, because of the pressure adjusting apertures, a stable floating posture can be maintained while the slider is floating up.

DESCRIPTION OF THE PREFERRED EMBODIMENTS

The embodiments of the present invention will be described with reference to the drawings.

Figure 1:
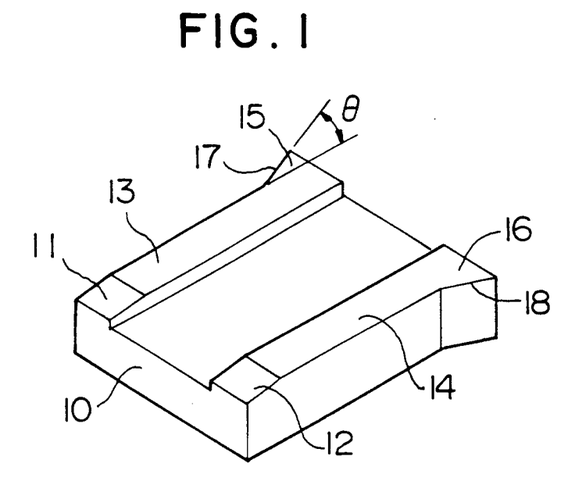
FIG. 1 is a perspective view showing an embodiment of a magnetic head slider in accordance with the present invention.
Figure 2:
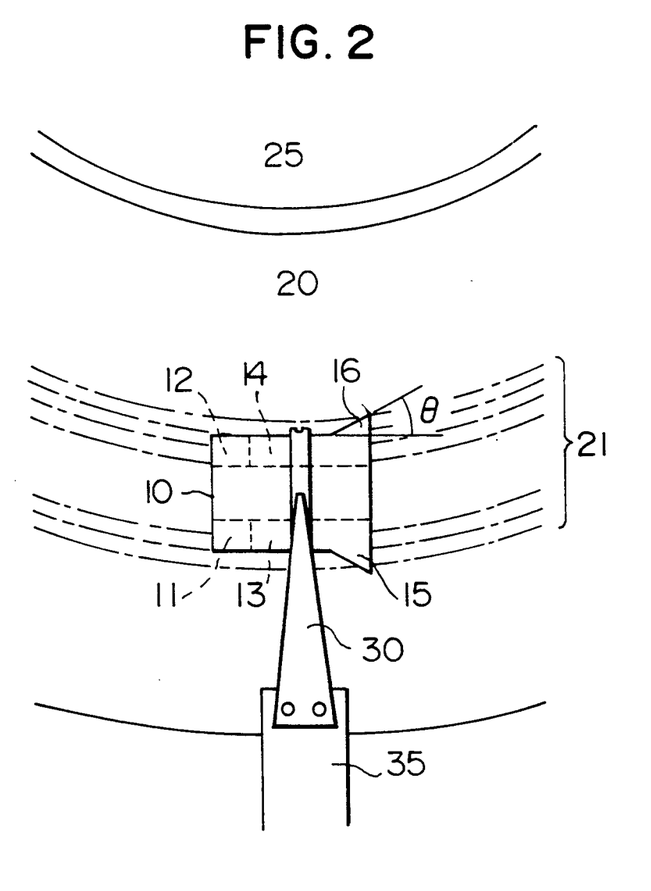
FIG. 2 is a plan view of a magnetic disk unit on which the magnetic head slider of this invention is mounted.

FIG. 1 shows an embodiment of a floating magnetic head in accordance with the present invention. A magnetic head slider 10 has wing-like triangular protruding portions 15 and 16, which constitute the unique features of this invention. These wing-like triangular protruding portions 15 and 16 are formed respectively on outflow sides of two slider rails. The wing-like triangular protruding portions 15 and 16 are so shaped that the width of each of these portions 15 and 16 becomes wider as it approaches the outflow end. FIG. 2 illustrates the structure of a magnetic disk unit on which a magnetic head composed of a head slider 10 of this embodiment is mounted. Numeral 10 denotes the head slider; numerals 11 and 12 head inflow ends; numerals 13 and 14 the slider rails; numerals 15 and 16 the wing-like triangular protruding portions; numerals 17 and 18 protruding portion sides; numeral 20 a magnetic disk; numeral 21 a track; numeral 25 a spindle; numeral 30 gimbals; and numeral 35 a head arm. Seeking operations and positioning of the magnetic head are performed, with the aid of the head arm 35, by an unillustrated actuator mechanism.

In the above construction, the positional relationships between the head inflow ends 11, 12 and the wing-like triangular protruding portions 15, 16 are as shown in FIG. 2. In other words, more specifically, the inflow end 12 of the slider rail 14 in the internal circumference of the slider 10 is positioned closer to the external circumference of the same than is the wing-like triangular protruding portion 16. The inflow end 11 of the slider rail 13 in the external circumference of the slider 10 is positioned closer to the internal circumference of the same than is the wing-like triangular protruding portion 15. Thus, the inflow ends 11 and 12 are positioned interiorly of the wing-like protruding portions 15 and 16. In this embodiment, side walls of the protruding portions 15 and 16 (faces respectively intersecting with the sides 17 and 18) are respectively perpendicular to the faces of the rails 13 and 14 which float up. In the floating magnetic head as constructed above, when the magnetic head is caused by a seeking operation to move over the magnetic disk, particles adhering to the rotatable magnetic disk are first brought into contact with the sides 17 and 18 of the wing-like triangular protruding portions 15 and 16, respectively. At this time, the particles adhering to the rotatable magnetic disk are scraped away from the disk by means of the sides 17 and 18 of the wing-like triangular protruding portions 15 and 16, and are carried along the respective surfaces of the sides 17 and 18. The surface of the magnetic disk is thus cleaned, without the scraped off dust being caught by the tapered portions of the inflow ends 11 and 12. As is clear from the above explanation, in this embodiment, since the wing-like triangular protruding portions 15 and 16 are symmetrically formed on a pair of rails 13 and 14 on both sides of the slider 10, the surface of the magnetic disk is effectively cleaned, regardless of the seeking direction. In other words, while the magnetic head is performing seeking operations, the wing-like triangular protruding portions are respectively positioned in front of the inflow ends with respect to a seeking direction, so that particles adhering to the rotatable magnetic disk first come in contact with the wing-like triangular protruding portions, and then are scraped away from the disk.

Figure 3:
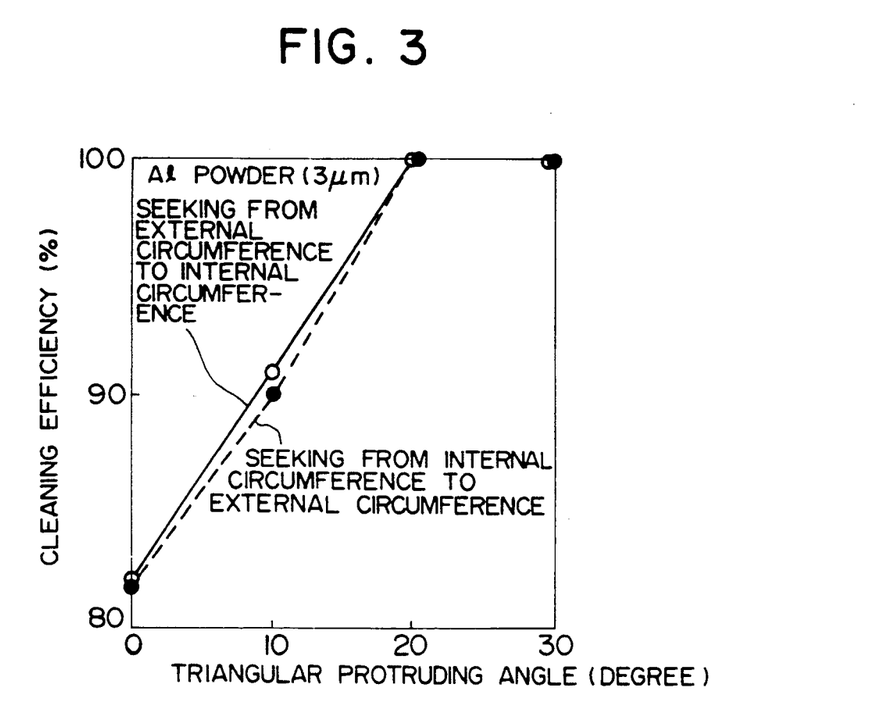
FIGS. 3 and 4 are views showing the results of experiments in which the relationship between the effects of cleaning and angles of wing-like triangular protruding portions of the magnetic head slider in accordance with the embodiment shown in FIG. 1 are examined.
Figure 4:
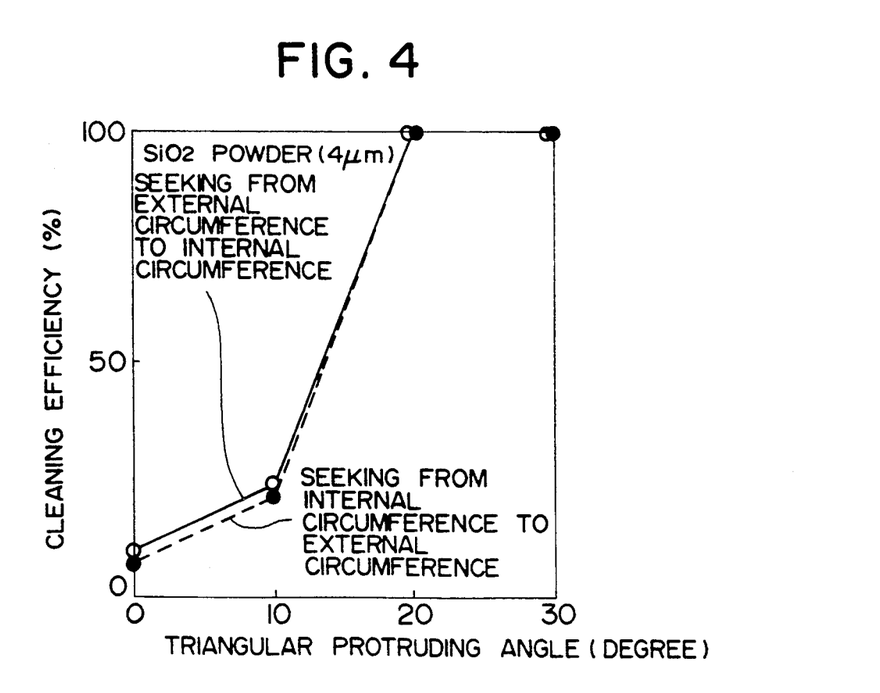

FIGS. 3 and 4 show an example of the results of the experiments, these experiments having been conducted in regard to the effects of the protruding portions 15 and 16 on the slider 10 of the magnetic head in accordance with this embodiment.

First, about 5000 dust particles were adhered to a magnetic disk having a diameter of 9.5 inches. Al powder (particle diameter was 3 $\mu$m) and SiO$_2$ powder (particle diameter was 4 $\mu$m) were used as adhering particles.

The effects of cleaning were ascertained in the following manner. The magnetic disk to which the dust was adhered was caused to rotate at 3600 rpm. Seeking operations were performed, by the magnetic head of this embodiment, in a direction from the external circumference to the internal circumference, and vice versa. This seeking operation was carried out only once for each of the above directions. In the experiments, the flying height of the magnetic head was 0.2 $\mu$m, and the time required for one seeking operation was 10 seconds. The angle $\theta$ between the wing-like triangular protruding portion 15, 16 and a straight portion of the slider 10 was formed at 10°, 20°, and 30°. The angle $\theta$ was 0° when there were no protruding portions. The effects of cleaning were ascertained by determining the number of particles remaining after the experiments. The cleaning efficiency was determined as follows: the number of the remaining particles were subtracted from the number of particles at the start of the experiments, the difference being the number of removed particles. This number of removed particles was divided by the number of particles at the start of the experiments.

As shown in FIG. 3, because of the protruding portions 15 and 16, the cleaning efficiency was improved by 10-20% for Al powder (particle diameter was 3 $\mu$m). When the angles $\theta$ at the protruding portions 15 and 16 were each 20° or more, dust was completely removed, 100% cleaning efficiency being obtained.

Furthermore, as illustrated in FIG. 4, with SiO$_2$ powder (particle diameter was 4 $\mu$m), the cleaning efficiency was only 10% or less under the conditions where the angle $\theta$ was 0° and there were no protruding portions. Thus, the cleaning efficiency was little ascertained. On the contrary, when the angles $\theta$ at the sides 17 and 18 of the protruding portions 15 and 16 were each 20°, 100% cleaning efficiency was obtained, the same cleaning efficiency as that obtained with Al powder. The cleaning efficiency obtained when seeking was made from the internal circumference to the external circumference was equal to that obtained when seeking was made in the opposite direction.

Figure 5:
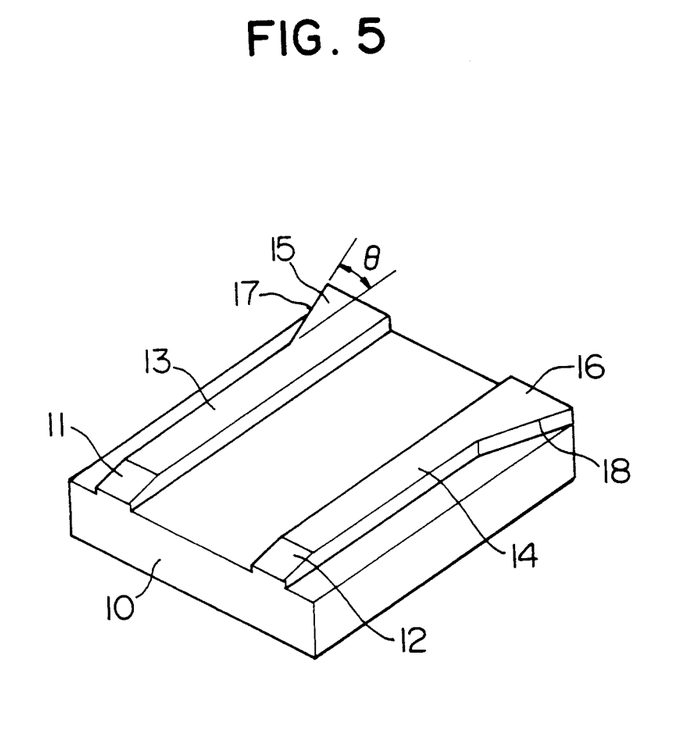
FIG. 5 is a perspective view showing a second embodiment of the magnetic head slider in accordance with this invention.

FIG. 5 shows a second embodiment of the present invention. In FIG. 5, components designated by the same names as those in FIG. 1 are denoted by like reference numbers. Wing-like triangular protruding portions 15 and 16 are constructed in such a way that a slider 10 has steps so that the width of each of slider rails 13 and 14 on outflow ends of the slider rails becomes wider as it approaches the outflow end. (These wing-like triangular portions 15 and 16 are constructed in such a manner that recesses are formed by partially cutting, thicknesswise, both sides of an originally square slider.) The slider 10 in this embodiment is readily machinable, as compared with the slider 10 in FIG. 1 in which the wing-like triangular protruding portions 15 and 16 are formed by cutting almost all the sides of an originally square slider. Needless to say, the effects of the cleaning as regards the slider 10 in this embodiment are the same as those in the first embodiment.

Furthermore, in a modification of this embodiment, the slider having the above wing-like triangular protruding portions can be applied to the cleaning of a single magnetic disk before the disk is incorporated into a HDA.

In the above embodiments, although the respective sides 17 and 18 of the protruding portions 15 and 16 are formed linearly, these sides 17 and 18 may also be formed curvedly so that the tapered angles 8 become wider as they approach the outflow ends.

A third embodiment of the floating magnetic head in accordance with the present invention will now be described with reference to FIGS. 6a, 6b, 6c through 11.

Figure 6A:
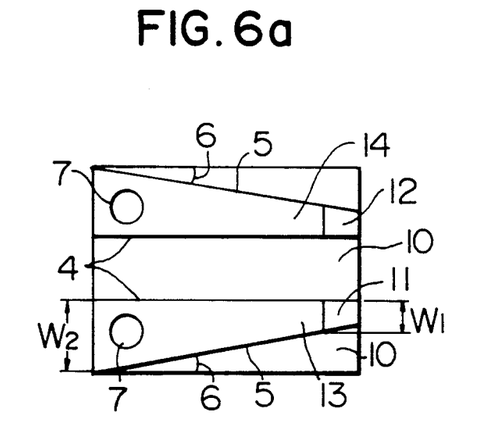
FIG. 6a is a plan view of the magnetic head slider which is a third embodiment of the present invention.
Figure 6B:
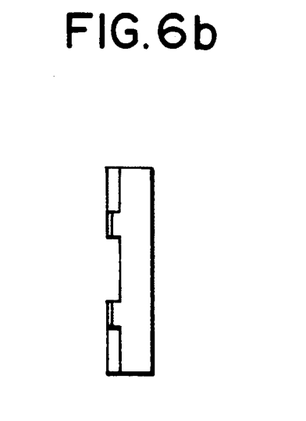
FIG. 6b is a side view in which the magnetic head slider shown in FIG. 6a is seen from the inflow side.
Figure 6C:
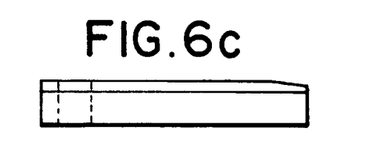
FIG. 6c is a side view in which the magnetic head slider shown in FIG. 6a is seen from an external side of a rail.

FIGS. 6a, 6b, 6c are perspective views of a magnetic head slider in accordance with the third embodiment. A magnetic head slider 10 has head inflow ends 11 and 12, slider rails 13 and 14, and a magnetic head (not shown). These head inflow ends 11 and 12 as well as the slider rails 13 and 14 face a magnetic disk, and serve as floating faces in which bearing effects are generated. Respective internal sides 4 of the head inflow ends 11 and 12 and of the slider rails 13 and 14 are so formed as to be substantially parallel to a tangential velocity vector line of the rotatable magnetic disk. Skew angles 6 are formed on external sides 5 of the rails 13 and 14, these skew angles 6 diverging from the gas inflow side to the gas outflow side.

Figure 7A:
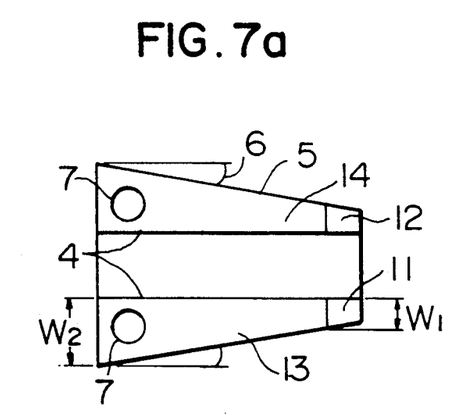
FIG. 7a is a plan view of the magnetic head slider which is a fourth embodiment of the present invention.
Figure 7B:
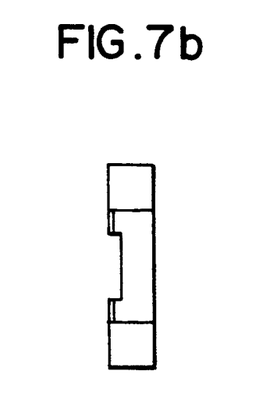
FIG. 7b is a side view in which the magnetic head slider shown in FIG. 7a is seen from the inflow side.
Figure 7C:
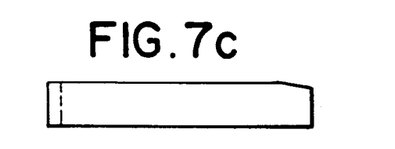
FIG. 7c is a side view in which the magnetic head slider shown in FIG. 7a is seen from the external side of the rail.

FIGS. 7a, 7b, 7c show a fourth embodiment in which the effects of cleaning are the same as those of the third embodiment illustrated in FIGS. 6a, 6b, 6c. A face of a magnetic head slider 10 which faces a magnetic disk is shaped into a trapezoid.

In the magnetic head sliders 10 of the third and fourth embodiments shown in FIGS. 6a, 6b, 6c, 7a, 7b and 7c, the width $W_1$ of each of the slider rails 13 and 14 on the gas inflow side is set to be smaller than the width $W_2$ of each of the slider rails 13 and 14 on the gas outflow side. Therefore, a float gap $h_2$ on the gas outflow side of the slider rails 13 and 14 may become greater than a float gap $h_1$ on the gas inflow side. This increase depends upon the degree of the skew angle 6. As a result, the floating posture of the magnetic head sliders 10 may not become stabilized.

For the above reasons, the head slider 10 in accordance with the present invention is provided with pressure adjusting apertures 7 on the gas outflow side of the slider rails 13 and 14. The head slider 10, while floating up, is so set to have a gap ratio ($h_2/h_1$) equal to a gap ratio of the conventional magnetic head slider. In this conventional magnetic head slider, the width of a rail on the inflow side is the same as that of a rail on the outflow side. The above setting is made possible by releasing, on the outflow side, part of gas which is compressed by the slider rails 13 and 14 toward atmospheric pressure.

Figure 8:
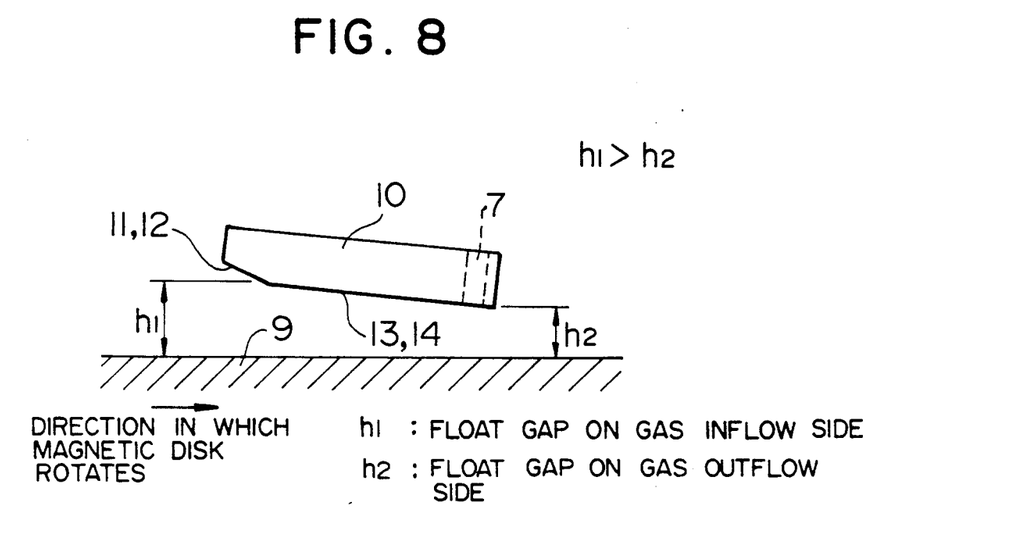
FIG. 8 is a view explaining effects of pressure adjusting apertures.
Figure 9:
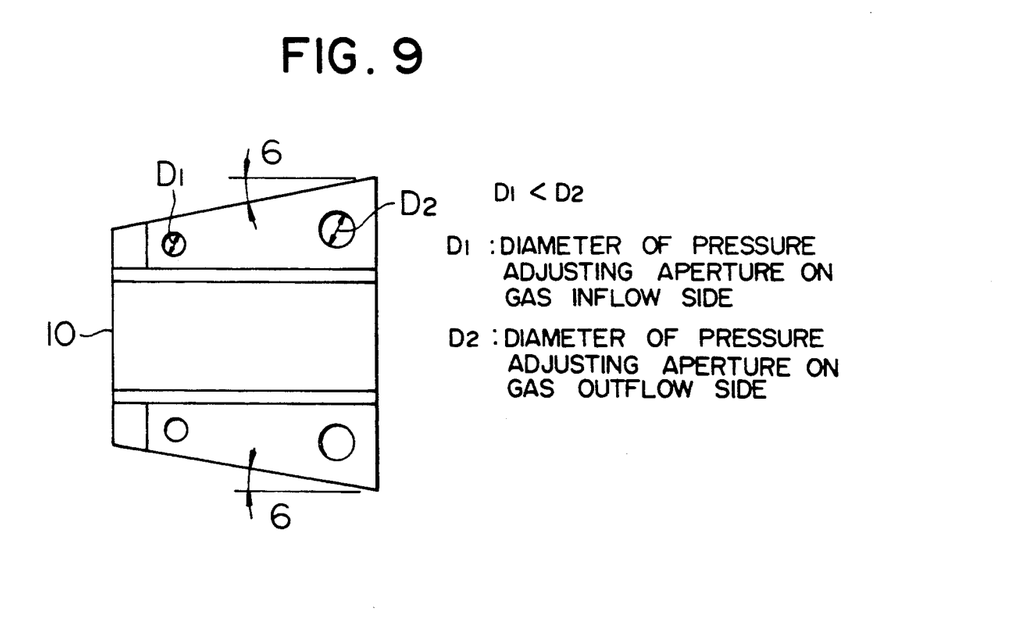
FIG. 9 is a plan view of the magnetic head slider in which pressure adjusting apertures are formed on gas inflow sides as well as on gas outflow sides of the slider rails.

FIG. 8 illustrates the above conditions. The pressure adjusting apertures 7 are not necessarily penetrated through. If the pressure adjusting apertures 7 are penetrated through, however, dust intruded under the slider rails 13 and 14 can be removed by being carried on gas which flows through the pressure adjusting apertures 7, and flows further along the back of the magnetic head slider. Moreover, as shown in FIG. 9, the same effects as described above can be obtained for the gas inflow side. This is made possible by providing pressure adjusting apertures 7 in which the diameter $D_1$ of each of the pressure adjusting apertures 7 on the gas inflow side is less than the diameter $D_2$ of each of the pressure adjusting apertures on the gas outflow side ($D_1 < D_2$).

Figure 10:
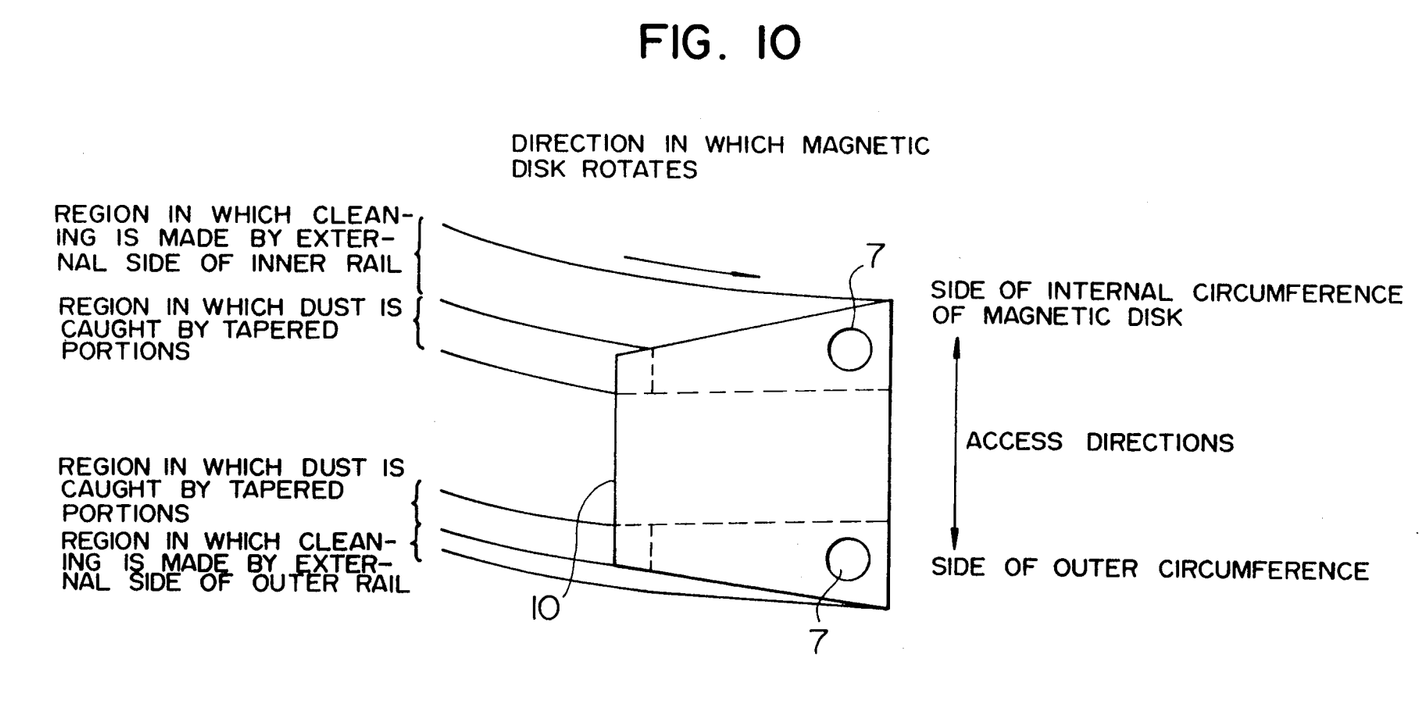
FIG. 10 is a view explaining effects of the magnetic head slider of the present invention.

FIG. 10 is a view explaining the operations of the magnetic head slider of the present invention, this magnetic head slider removing dust adhered to the magnetic disk. Dust which adheres to the magnetic disk and whose size is larger than the float gap strikes against the external sides 5 of the rails 13 and 14 on the magnetic head slider 10. The dust then bounces back, and is carried on gas away from the surface of the magnetic disk. This is because the predetermined skew angles 6 are formed on the external sides 5. This is also because, when the magnetic head slider 10 is caused to move not only to an internal circumference region of the magnetic disk, but also to an external circumference region of the magnetic disk, the external sides 5 move in front of the head inflow ends 11 and 12. At the same time, small particles intruding under the slider rails 13 and 14 can also be removed due to their being discharged through the pressure adjusting apertures 7. These small particles may cause variations in flying heights.

Figure 11A:
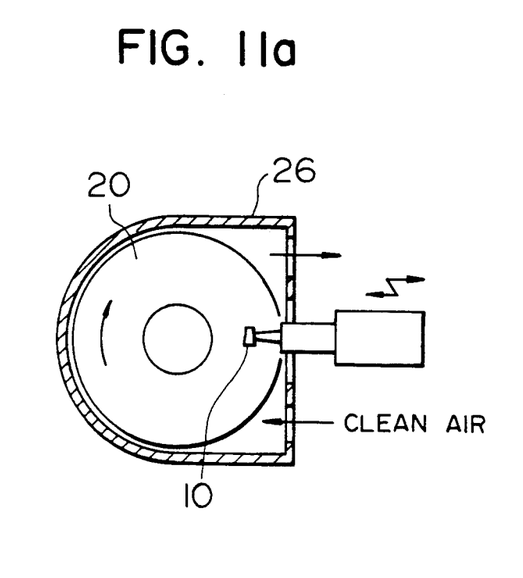
FIGS. 11a and 11b are views explaining a method of manufacturing a magnetic disk unit using the magnetic head slider of the present invention.
Figure 11B:
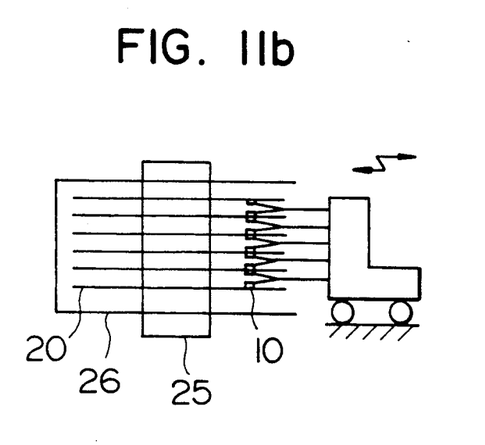

In addition, use of the magnetic head slider 10 of the above embodiments permits the carrying out of a method for manufacturing magnetic disk units which will be described below. As shown in FIGS. 11a and 11b, this method of manufacturing magnetic disk units is applied to a process in which a magnetic disk 20 and a rotation mechanism system 25 are housed in a base 26 which constitutes a surrounding wall of the magnetic disk. Before a drive mechanism system of the magnetic head slider 10 is combined with the base 26, the magnetic head slider 10 of the embodiments is reciprocated, while the magnetic disk 20 is caused to rotate, at a slow speed sufficient for removing dust on the magnetic disk. During this reciprocation, clean air is forcedly supplied into the base 26 in which the magnetic disk is housed. This clean air is fed in the rotation direction of the magnetic disk 20, and is then evacuated. Thus, dust which strikes against the external sides 5 of the rails 13 and 14 on the magnetic head slider 10, and which is discharged through the pressure adjusting apertures 7, can be carried on this clean air, thereby being discharged to the outside of the base 26. It is thus possible to reduce dust caused at the initial stage of the manufacturing process for magnetic disk units.

As regards the pressure adjusting apertures 7, the size of each aperture, the configuration of each aperture and the location at which each aperture is formed are not limited to those disclosed in the present invention.

As has been described above is detail, according to the first and second embodiments of the present invention, the wing-like triangular protruding portions are symmetrically formed on the outflow ends of the rails on the floating magnetic head slider. Because of this arrangement, particles adhering to the magnetic disk surface can be effectively removed from the magnetic disk surface. The adhering particles can be removed during operations in which seeking is made from the internal circumference to the external circumference of the magnetic disk, and vice versa. These adhering particles include abrasion powder from the head and the magnetic disk. This abrasion powder is generated at the start and end of the magnetic disk rotation by a contact start stop (CSS) method. The adhering particles may become a problem while the magnetic disk unit is in operation. The adhering particles also include dust and abrasion powder which is caused by components inside an HDA. As a result of these particles being removed from the surface of the magnetic disk, it is possible to prevent these particles from being buried in a magnetic film of the magnetic disk. It is also possible to prevent these particles from being adhered to the floating face of the slider. Thus damage to the magnetic disk can be prevented, and head flying problems can also be prevented.

Thus, highly reliable magnetic disk units which slide readily can be realized.

Furthermore, while the outline of the entire slider remains substantially a square, the wing-like triangular protruding portions are formed only on the outflow ends of the slider. As a result, it is possible to maintain floating stability so that floating characteristics are little affected.

Moreover, according to the third and fourth embodiments of the present invention, it is possible to remove from the magnetic disk not only dust particles whose sizes are larger than the float gap between the magnetic head slider and the magnetic disk, but also dust particles whose sizes are smaller than the float gap. The dust particles larger than the float gap can be removed by the rail external sides of the magnetic head slider having skew angles, whereas the dust particles smaller than the float gap can be removed by being discharged through the pressure adjusting apertures. In addition, because of the pressure adjusting apertures, a stable floating posture of the magnetic head slider can be maintained, regardless of the fact that the rail width on the inflow end differs from that on the outflow end.

It is thus possible to prevent the magnetic disk from being damaged by dust, and further, to improve the reliability of magnetic disk units.

What is claimed is:

1. A magnetic head slider, having a disk-advancing end facing a direction in which a rotating disk advances towards the magnetic slider, and a disk-receiving end facing a direction in which the rotating disk recedes from the magnetic head slider, comprising a pair of slider rails provided on opposing sides of said magnetic head slider, said slider rails having opposing inner sides which extend substantially parallel to a tangential velocity vector line of the rotating magnetic disk, and outer sides having protruding portions which diverge in the direction of the disk-receding end of said magnetic head slider, said protruding portions extending outwardly beyond said outer sides at the disk-advancing end of said magnetic head slider when viewed in a direction parallel to said inner sides of said slider rails.

2. A magnetic head slider according to claim 1, wherein said pair of slider rails are shaped in such a manner that both sides of a substantially square slider are cut from the sides of floating faces, whereby said protruding portions are formed on the disk-receding ends.

3. A magnetic head slider for use on a rotatable magnetic recording medium having concentric tracks thereon, comprising a plurality of rails cooperating with the magnetic recording medium in generating a gas bearing effect therebetween, said rails having inner sides extending substantially parallel to a tangential velocity vector line of the rotating magnetic recording medium, and outer sides having skew angles so as to diverge from a disk-advancing end towards a disk-receding end of said rails such that said outer sides protrude at their disk-receding ends outwardly beyond said outer sides at the disk-advancing end of said rails, and at least one pressure adjusting aperture formed in a portion near the disk-receding end of said rails.

4. A magnetic head unit according to claim 3, wherein at least one pressure adjusting aperture is formed on the disk-advancing side of each of said rail portions on said magnetic head slider.

* * * * *